June 3, 1941.   G. F. BUCKINGHAM   2,244,139
PROPELLER
Filed Jan. 21, 1937   2 Sheets-Sheet 1
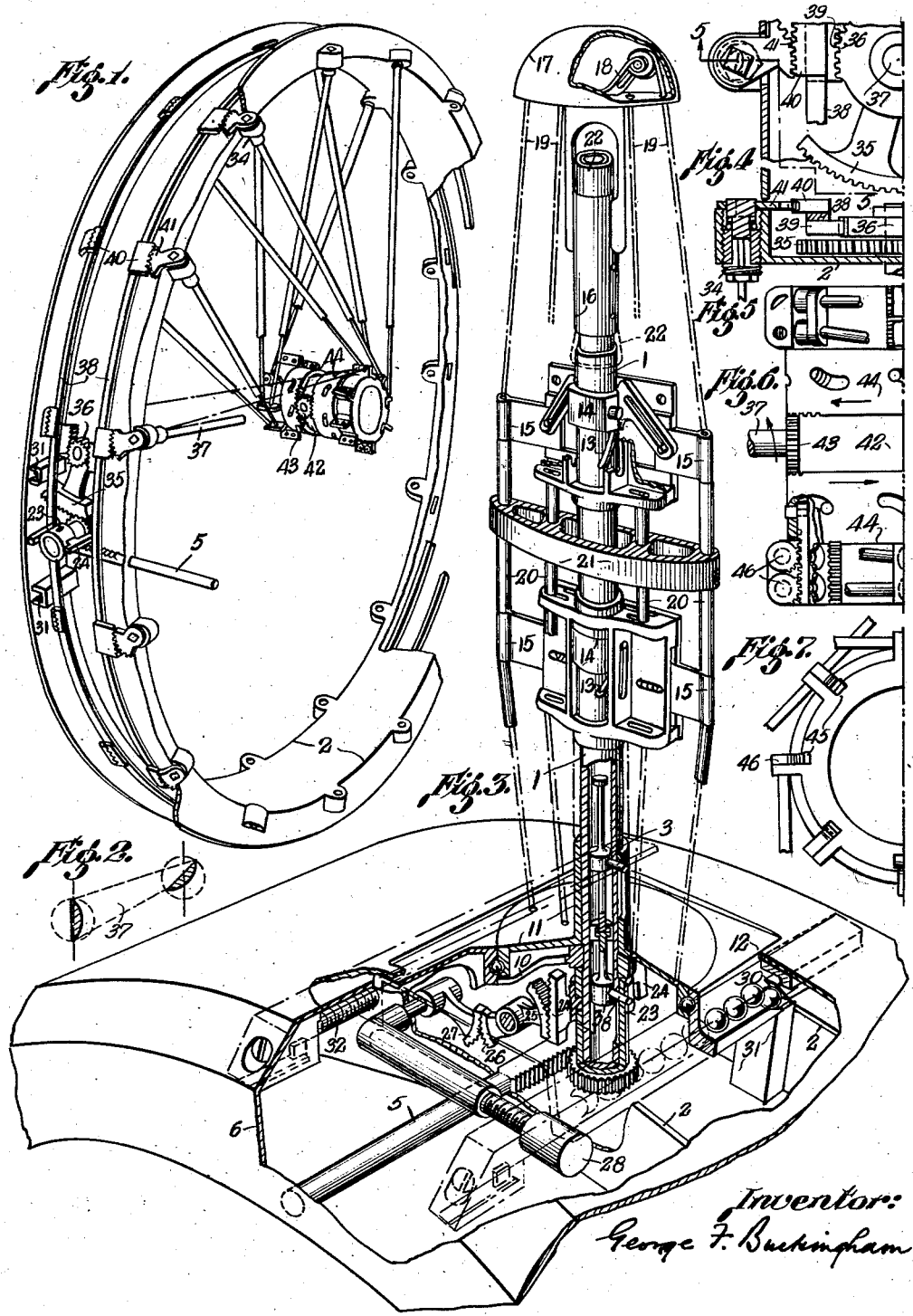
Inventor:
George F. Buckingham.

June 3, 1941. G. F. BUCKINGHAM 2,244,139
PROPELLER
Filed Jan. 21, 1937 2 Sheets-Sheet 2
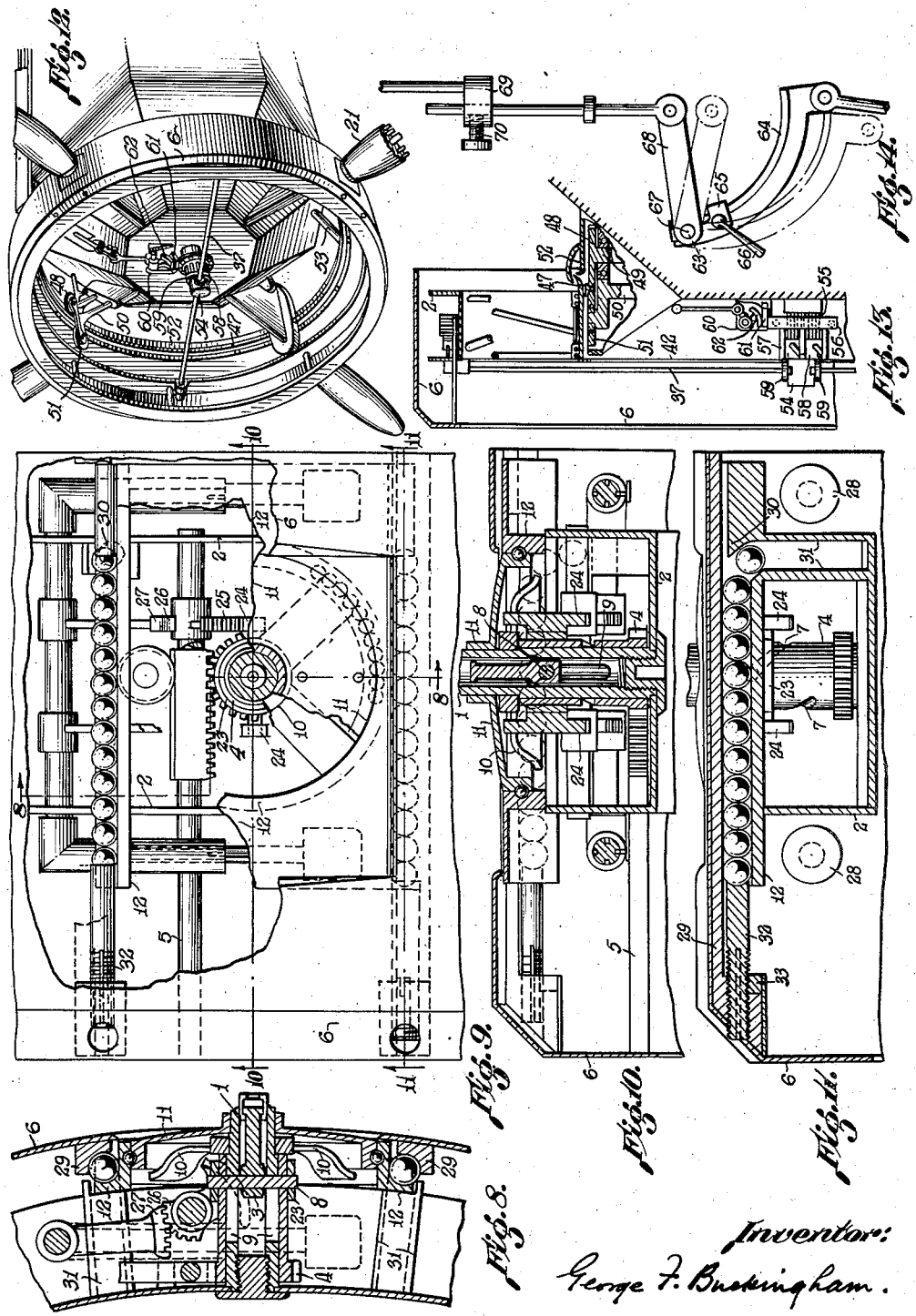
Inventor:
George F. Buckingham.

Patented June 3, 1941

2,244,139

UNITED STATES PATENT OFFICE 2,244,139

PROPELLER

George Frederick Buckingham, Oakland, Calif.

Application January 21, 1937, Serial No. 121,493

17 Claims. (Cl. 170—161)

This invention relates to improvements in propellers, primarily, but not exclusively, those used in aircraft.

In order that the objects of this invention may be understood it is expedient and may be necessary, first to set forth certain theoretical assumptions and certain facts concerning the conditions affecting the performance of a blade of an aircraft propeller, inasmuch as these have influenced the structural features of the device.

The assumptions are: that elements of a blade may properly be regarded as contiguous airfoil sections, individually of infinitesimal span: that "constant speed" of rotation makes for engine efficiency (best performance being secured at the "design rate"): that a blade element develops the best ratio of lift (thrust) to drag (torsional resistance) when it is set at a certain angle to the direction of its movement: that when a propeller rotates at "constant speed," with all its blade elements set at the angle of L/D max., the sum of the torsional resistances developed by the elements exactly equals the available engine power: that, when set for best efficiency, the resistance developed by an element of fixed area varies as the square of its true velocity.

The facts to be noted are: that the speed of flight is imparted to every element of a propeller blade; that, while the engine continues to operate, a certain rotative speed is imparted to each element of a blade, different from that imparted to any other; that the true directions and the true velocities of the elements' movements are the resultants of the common forward speed and of their individual rotative speeds; that any change in the speed of flight causes changes in the true direction of movement and in the true velocity of every element of a blade; that these changes are not uniform but are proportionally greater for elements of relatively low rotative speed; that the settings of all the elements of a blade are therefore required for full efficiency, to be adjustable in different degree: that the effective area of a blade is required for full efficiency to be capable of variation to compensate for the changes in the true velocities of its elements, caused by changes in the speed of flight; that, when the difference between the "low" and the "high" speeds of flight is very pronounced, then, as the top of the range is approached, all the elements of a blade, but particularly those of relatively low rotative speeds, exert the thrust forces which they develop in directions which tend to become less favorable for propulsive effect; that, at very high flying speeds, conditions prevail which virtually nullify the useful effect of elements placed near the axis; that the changes which take place in the true directions of elements so placed demand great changes in their settings if the development of negative thrust is to be avoided; that the very great changes which occur in the true velocities of elements so placed theoretically require compensatory changes of area which are so large as to appear obviously impracticable; that the resistances developed by elements so placed increase largely as their usefulness decreases.

The objects are: First, to provide means whereby each concentric part of the blade surfaces may automatically be caused to assume substantially the correct angular setting and also the proportional area conforming to the true direction and velocity of its movement at the prevailing forward speed; second, when the conditions at and near the "top" speed of the range are such that any part of a blade surface placed near the axis would be unable to add appreciably to the effective thrust and would develop greatly increased resistance, to provide means whereby the more efficient outer parts may be rotated while the effect of such inner parts is eliminated; third, when the conditions are such that the changes of area demanded are so large as to be impracticable for blade parts within a radius which is greater than that which limits the employment of the means for elimination, to provide flexible members in the intermediate zone capable of transmitting rotative impulses and thrust forces, the settings of whose inner and outer ends may be differentially changed automatically in accordance with the angular changes demanded in order that resistance developed by these parts may be kept as low as possible; fourth, to provide correlated automatic means, optionally employable, adapted to maintain a selectable rate of engine revolution.

These objects are integral to the purpose of the invention which is to secure substantially constant thrust, at the rate of revolution chosen, throughout the range of forward speeds; they are obtained by mechanism illustrated in the accompanying two sheets of drawings, in which—

Figure 1 is a perspective drawing of flexible members replacing certain blade parts; Fig. 2 is a diagrammatic detail typical of certain rigid radially disposed rotating members; Fig. 3 is a perspective view showing the general disposition of means whereby changes of the angular settings of concentric blade parts and variations of blade area may be effected; Fig. 4 is a plan view partly in section of means for adjusting the tension of flexible members and of means for changing the angular setting of their outer ends; Fig. 5 is a sectional view on the line 5—5 of Fig. 4; Fig. 6 is a side view partly in section of Fig. 7; Fig. 7 is an end view of means for securing the inner ends of flexible members, and for effecting changes in their angular settings; Fig. 8 is a composite sectional view, partly on the line 8—8 of Fig. 9; Fig. 9 is a plan partly in section of parts employed in the application and control of the forces by which requisite changes are effected in blade parts; Fig. 10 is a section on the line 10—10 of Fig. 9; Fig. 11 is a section on the line 11—11 of Fig. 9; Fig. 12 is a perspective view of a construction by which the more efficient outer parts of blade surfaces may be rotated when the effect of certain inner parts is eliminated, means for throttle control also being shown; Fig. 13 is a diagrammatic sectional view of a construction adapted to meet conditions incidental to a high rate of rotation and a very extended speed range; Fig. 14 is a detail of elements in the throttle control linkage.

To ensure uniformly efficient performance at all speeds of flight, a blade of a propeller should be composed of elements capable of adjustment to every change of direction and of velocity which the changes of flying speed unavoidably entail and should not include any element which at the highest speeds of the range would be required to set at an angle unfavorable to the effective application of any thrust force it might develop.

Such a blade has a mast 1, on which are pivotally mounted the positively controlled element-forms. Each typical element-form includes, slidably fitting the mast 1, a yoke 14, made with an arm on each side; slots are cut in these arms and pins, projecting from extensors 15, are movably engaged in the slots. Thus any movement of the yoke along the mast is caused to change the distance between the ends of extensors and to alter the area of the blade.

The innermost or base element-form 11, has no extensors; it consists simply of a sleeve rotatably fitting the mast 1, it is enlarged at its inner end into a circular flange of a diameter equal to the width of the base element.

The outermost or tip element-form 16, also has no extensors; it is a simple sleeve rotatably fitting the mast, made with supports for the tip shield 17.

Wires 19, are firmly secured to the flange of the base element-form 11, they pass through pipe-like reinforcements 20, which are embedded in the flexible, elastic covering 21 between the element-forms. The wires also pass through passages in the ends of the extensors 15; they are carried around rollers mounted on springs which keep them taut and which are housed in the tip shield 17.

A stop band 22, is fixed on the mast for each element-form to prevent its outward movement.

Placed within the mast 1, is a rod composed of separate links, connected in such a manner that they may be turned readily through different angles; each link is made with a node 3, which slidably fits the bore in the mast. In each node a pin is fixed transversely to the link; the node pins pass through differently curved slots cut in the mast; the nodes and the slots are placed at intervals corresponding to the spacing of the controlled element-forms.

The ends of the node pins are engaged in straight slots in the element-forms. In a typical element form the node pin also passes through holes in the yoke and any movement of the rod along the bore in the mast thus causes different changes of angular settings for all the controlled elements and also changes the area of the blade.

The heels of masts are secured to the web of a channel ring 2, from which each mast extends radially outward.

Set firmly on mast 1, in a position immediately next to and inside the rotatable circular flange of the base element 11, is a collar shown as being made in one piece with 4 curved members extending radially from it. The outer ends of these curved members clear the inwardly returned edge of the said flange and are made fast to a circular part of the frame 12. This radial-armed piece contributes to the rigidity of the mast 1, and is called the cross stay 10 (see Figs. 3, 8, 9 and 10). Further support is given to the mast 1, by the sleeve of the base element 11; in the inwardly returned edge of the circular flange of this base element 11, a groove is formed and balls or rollers are set therein engaging a complementary groove in the circular part of the frame 12. The frame 12, is made with parallel straight members tangent to its circular part and these are set transversely across the edges of the channel ring 2, to which they are fastened.

The transverse edges of the frame 12 are shaped so that each makes one side of a straight race or runway for a series of balls (see Figs. 9 and 11). The other sides of these races are formed by stiffeners 29, attached to a circular cowl 6, concentric with the ring 2. The front of the cowl 6, is turned inwardly so that the clear opening is less than its maximum diameter.

The heel sleeve 4, is rotatably fitted on the mast 1, between the web of the channel ring 2 and the cross stay 10; its inner end is cut into a gear which meshes with the main rack 5, a member which is extended to pass through an opening in the front flange of the ring 2 and is firmly attached to the cowl 6.

The inner end of the innermost link of the rod is formed into a node 3, in which the master node pin 8 is fixed transversely; this pin passes through slots 9, cut longitudinally in the mast and also through slots 7, cut diagonally in the heel sleeve 4. Any telescopic movement of the cowl 6, in relation to the ring 2, due to variations in the frontal air pressure on the cowl by the action of the rack 5 causes the heel sleeve 4 to turn on the mast 1; the master node pin 8 is then forced along the slots 9, by the sides of the diagonal slides 7; thus the entire articulated rod is moved within the mast with the effects noted above.

The runways or races for the series of balls are partially obstructed by switch points 30 (see Figs. 3, 9 and 11), fixed firmly at the rear flange of the channel ring 2, so that as the cowl comes aft in relation to the ring, certain of the balls, which are required to have definite weights, are diverted into radially extending pockets 31. So placed they develop centrifugal forces which at any stage of the range are, in the aggregate, equivalent to the frontal air pressure on the cowl.

Each series of balls has a threaded adjuster pin 32; a locking bolt 33 is held by a spring in close engagement with that particular one of a plurality of longitudinal chases, cut to the base of the thread, which maintains the adjustment desired.

The centrifugal forces developed by element-forms are transferred to the mast by the stop bands 22. In order to counterbalance forces of this character developed by the rods within the masts, by their node pins and by the yokes of typical element-forms, the ends of the master node pin 8 are extended and set into a collar, 23, which movably encircles the heel sleeve 4. This collar 23 is provided with racks 24 meshing with arc gears 25, 26 and 27, which cause the forces developed by adjustable counterweights 28, substantially to equalize those developed by the rod parts.

Highest efficiency is obtained when the means for effecting rotation of the ring 2 do not rotate with it.

Firmly secured at intervals to the inner surface of the ring 2, but of a slightly smaller diameter, there is a circular gear 47, meshing with gears 48, which are set on radial auxiliary shafts 49, driven by bevel gears (not shown); the master bevel gear being fixed on the engine shaft. Brackets 50, secured to the frame of the engine, house the bearings for these auxiliary shafts and also carry pins on which are mounted the thrust wheels 51. An annular member 52 collects excess lubricating oil thrown off from the ring 2; it is returned to the pump through a pipe 53.

In cases where high rotative rates make it impracticable to employ a circular gear 47, of a diameter approximately as large as that required for the ring 2, an inner ring 42, (see Figs 1, 4, 5, 6, 7 and 13) of a reduced diameter becomes necessary and connecting members are introduced between the ring 2 and the inner ring 42.

The resistance of these connecting members is reduced to a minimum when they are streamlined in form and when the different adjustments required for their outer and inner ends are accurately made at every stage of the speed range.

These connecting members are adjustable for tension by threaded sleeves 34, set in sockets formed in the channel ring 2. An arc gear 35 (see Fig. 1) is mounted on a rigid member 37, close to its outer end, in mesh with the gear of the heel sleeve 4. This rigid member passes through the web of the ring 2 extending radially to the inner ring 42, in which is provided a bearing for its inner end.

A gear 36, fixed at its outer end, by racks, moves hooplike members 38 placed in the ring 2. These hoops are provided with racks 40 which mesh with arc gears 41 fixed on the outer ends of the flexible connecting members; so that, whenever the heel sleeve 4 is turned by the action of the main rack 5 responding to variations in frontal pressure on the cowl 6, the outer ends of the flexible connecting members are changed in setting and the angle of minimum resistance of the said members to movement through the air is substantially maintained. Next to its inner bearing, the rigid radial member 37 has an attached gear 43, meshing with racks cut in the edges of members 44, and encircling the inner ring. Any turn of the rigid member 37 thus causes the encircling members 44 to move on the inner ring 42. Slots cut in the members 44 actuate engaged pins projecting from racks in mesh with arc gears attached to the inner ends of the flexible connecting members, causing these inner ends to assume substantially the correct angular setting required at all stages of the speed range.

Due to the manipulation of flying controls the demand on the engine for power varies constantly; acceleration or deceleration of the normal rate of rotation must ensue unless the throttle is adjusted instantly. To meet this situation, the engine shaft 54, (see Figs. 12 and 13), is made with a splined portion 55, on which is slidably fitted the inner race of a ball bearing 56, from which project fingers 57, having pins which are engaged in slots in a collar 58 encircling the shaft 54 and rotated thereon by the action of gears 59, attached to rigid radially extending members 37. A turning movement is given to these members whenever there is relative telescopic motion between the cowl 6 and the ring 2, by means similar to those previously described. The outer race of the ball bearing 56, is restricted to a fore and aft movement by a rack 61, attached to it, which sets between brackets 60, the latter fixed to the frame of the engine; a bell crank 62 having an arc gear meshing with the rack 61, actuates linkage connected with the throttle valve lever of the engine. This linkage includes, swinging on a fixed pivot 63, (see Fig. 14), an arcuate member 64, on which is slidably fitted a clamp 65, tightened by a screw lever 66. The clamp 65, carries a pin 67; a link 68, swings on this pin; its free end is connected by other links to the engine throttle. One of these links is provided with a sliding setting clamp 69, tightened by a screw 70.

The pilot is thus enabled to select a position of the clamp 69, which sets the engine throttle for the R. P. M. required. It is possible for him to place the clamp 65 in such a position that the variations of power demand are met automatically to the extent required. In Fig. 14, the automatic control is shown placed at its inoperative position, the movable pivot 67 is set in line with the fixed pivot 63, and there is no interference with the manual or other method of throttle control relied upon at such times.

The precise means to be employed in a given case must necessarily take into consideration the medium in which the construction is to operate, the speed range, and the R. P. M.; thus the scope of the invention cannot be restricted to any specific embodiment.

I claim and desire to protect by Letters Patent:

1. In a propeller blade, a flexible cover; a supporting mast placed longitudinally within the flexible cover; frames for concentric blade sections pivotally mounted on the mast; means adapted to hold each frame to a predetermined angle of attack with reference to the true direction of its movement, this movement being at all times and for each frame the resultant of the forward movement common to all section frames and of the rotative movement of each individual frame; automatic means which simultaneously actuate the holding means to change the angular settings of the different concentric section frames in different degree as demanded immediately changes occur in the resultant directions of the movements of the frames in order substantially to maintain the designated angle of attack with reference to the true direction of its movement in each and every concentric blade part to the end that each may function efficiently as an airfoil section at all times.

2. In the construction of a propeller blade a tubular mast set in a plane normal to the axis of rotation; slidable within the mast, an articulated rod; split couplings joining abutting portions of said rod; a node on each separate portion; a pin secured transversely in each node; curved slots in the sides of the mast through which said pins protrude; means adapted to cause movement of the rod longitudinally within the mast; frames for concentric blade sections set pivotally on the mast, each frame engaging the protruding ends of one of the said pins and thus being held at all times to an angular setting determined by the position of the rod within the mast; a flexible cover for the assembled blade.

3. In a propeller construction, a ring; a tubular blade mast attached to and extending outward radially from the ring; frames for concentric blade elements pivotally mounted on the mast; a flexible cover incasing the blade; a jointed rod in the tubular mast; nodes on each link or piece of the rod slidably fitting the bore in the mast; transverse holding pins secured in the nodes, each adjustably holding a blade element frame at a given instant to a definite angular setting; slots of appropriate curvature, in the mast, adapted to change the angular settings of blade element frames in predetermined, definite degrees by actuating changes in the transverse holding pins which pass through the slots and are movable in them, a master node pin fixed transversely in the node on the innermost link; longitudinal slots in the mast commencing near the heel or butt of the mast through which the master node pin passes; a sleeve moveably encircling the heel of the mast; sloping cuts in the heel sleeve through which the master node pin passes and is moveable; a gear on the heel sleeve; a cowl in telescopic connection with the ring; a rack attached to the cowl in mesh with the heel sleeve gear, so that any change of position of the cowl in relation to the ring causes the heel sleeve to turn on the mast and thus the master node pin is actuated to move the entire rod longitudinally within the mast, whereupon the transverse holding pins are caused to effect differential changes in the angular settings of the concentric blade element frames.

4. In a propeller blade an elastic cover; a supporting mast placed longitudinally within the elastic cover; frames for concentric blade sections mounted on the mast; means comprising extensors housed in the frames; means adapted to hold the extensors to that degree of extension which gives to each concentric part of the blade the area substantially in the correct proportion to the true prevailing speed of its movement, this speed being the resultant of the forward speed and of its own speed of rotation; automatic means which actuate the holding means to change the degrees to which extensors are extended, immediately any change occurs in the true resultant speeds of concentric blade sections in order that concentric blade areas may be maintained in substantially accurate proportional relation to their true speeds.

5. The combination in a propeller blade of a mast fixed radially with respect to the axis of rotation; frames for concentric blade sections mounted on the mast; extensors comprising members housed in and guided by the frames; means by which these extensors are caused to vary the chord length of controlled sections; an elastic cover for the assembled blade.

6. The combination in a propeller blade of a radial mast; concentric frames pivotally mounted thereon; extensors housed and guided in the frames; means for effecting differential changes in the angular settings of the frames; means whereby the extensors may be caused to change the effective chord lengths of sections, thus changing the area; a flexible, elastic cover for the assembled blade.

7. In a propeller blade a flexible, elastic cover; a supporting mast longitudinally placed within the cover; frames for concentric blade sections pivotally mounted on the mast; members comprising extensors, housed in the frames, capable of extending the minimum chord of blade sections; means for holding each frame to a predetermined angle of attack with reference to the true direction of its movement, which is the resultant of the prevailing forward movement and of its own movement of rotation; means for holding the extendible members to certain designed degrees of extension so that at a given instant each concentric area of the blade is caused to be in a definite designed proportional relation to the true speed of its movement, which is the resultant of the forward speed and of its own rotative speed; automatic means which simultaneously and immediately actuate the respective holding members to change differentially the angular settings and to change the chordal dimensions of concentric parts of the blade so that the designed angle of attack may be maintained in spite of changes which occur in the resultant directions and so that the blade area may be adjusted to conform to the changes which take place simultaneously in the resultant speeds of the movements of the concentric parts of the blade to the end that substantially constant thrust may be developed from a constant rate of rotation.

8. In a propeller construction the combination of flexible, elastic blade surfaces; frames for certain blade sections to be positively controlled; said frames pivotally mounted on masts extending outward radially from a ring to which the heels of the masts are secured; a concentric cowl movable telescopically in relation to the ring; means adapted to develop, and to apply to the cowl, forces at all times equal and opposite to the force of the air pressure exerted on its frontal surfaces, due to the motion of translation; means whereby changes in the relative disposition of the concentric ring and cowl brought about by the interaction of the forces affecting the cowl, are caused not only to actuate means whereby differential changes in the angular settings of the said pivotally mounted frames are effected but also to actuate other means whereby differential changes are effected in the area of concentric parts of the blades surfaces; means for rotating the ring to which the blade masts are fastened.

9. In a propeller construction, a ring; blades extending outwards radially from the ring; flexible, elastic covers for the blades; a supporting mast for each blade placed longitudinally within its flexible, elastic cover; frames for concentric blade sections pivotally mounted on the mast; members housed in the frames adapted to alter the chordal dimensions of blade sections; adjustable means for holding each frame to a predetermined angle of attack with reference to the true direction of its movement which, at a given instant, is the resultant of the forward movement and of its own movement of rotation; adjustable means for holding the extendible members to such degrees of extension as to ensure for each concentric part of a blade that area which at a given instant shall have a designed proportional relation to the true speed of the parts movement, which is the resultant of the prevailing forward speed and of its own rotative speed; automatic means adapted to actuate the respective holding means simultaneously in such a manner as to effect the adjustments of angular setting and of area required by concentric parts of the blades immediately any change occurs in the resultant directions and in the resultant speeds of their movements; a ring gear attached to the blade-supporting ring; gears meshing with the ring-gear; radial auxiliary shafts, to the outer ends of which said meshing gears are attached; bevel gears attached to the inner ends of said radial shafts; a master bevel gear in mesh with said bevel gears; axially disposed in relation to the ring gear, a drive shaft to which the master bevel gear is attached; thrust wheels in contact with the blade supporting ring adapted to receive the thrust force developed by the blades when the ring is rotated; pins on which the thrust wheels revolve; brackets attached to the engine frame or to some rigid part of the craft, holding the pins.

10. In a propeller construction a ring; means for rotating the ring; masts attached to and extending outward radially from the ring; frames for concentric blade sections pivotally mounted on the masts; members comprising extensors, housed in the frames, adapted to alter the chordal dimensions of blade sections; a sleeve turnable on the mast having a circular flange at its inner end of a diameter sufficient to accommodate the base section of the blade; wires attached to the circular flange passing through slots in the pivotally mounted frames and through holes near the ends of extensors; a tip shield for the outermost element of the blade; rollers mounted on springs, housed in the tip shield, adapted to maintain effective tension in the wires; means for changing the angular settings of frames; means for changing the protrusion of extensors from their housings; flexible, elastic surfaces completely covering frames, extensors and wires.

11. In a propeller blade construction, a ring; a mast extending radially outward from the ring to which its heel or butt is firmly secured; frames for controlled blade sections pivotally mounted on the mast; a flexible, elastic covering for the blade; the base blade section frame being formed with a sleeve turnably encircling the mast; the inner end of the sleeve being enlarged into a circular flange of a diameter approximating the chord of the base section; a groove being formed in the edge of the circular flange; balls or rollers being placed in the groove; a complementary grooved circular part being fixed to the ring to contribute further to the rigidity of the mast; a collar made with radially extending arms being fixed on the mast immediately next to, and inside the rotatable circular flange of the base section frame, the arms being curved inwardly so that they pass inside the grooved flange without interference and are firmly secured to the complementary circular part which is fixed to the ring, this part being made wider (or deeper) than the edge of the flange for this purpose.

12. In a propeller construction, a ring; means for causing the ring to rotate; tubular blade masts attached to the ring and extending radially therefrom; frames for certain positively controlled concentric blade sections pivotally mounted on the masts; rigging wires strung between the frames; pipe-like reinforcements through which the wires pass; flexible, elastic surfaces enclosing the masts, the rigging wires, the reinforcements and the frames; within each mast an articulated rod; means whereby the rod is caused to move longitudinally within the mast; means actuated by said longitudinal movement of the rod causing changes in the angular settings of the controlled section frames; means also actuated by said longitudinal movement of the rod causing changes in the effective chord-lengths of the concentric blade sections, thus changing the blade area; adjustable means for counterbalancing centrifugal forces developed by the articulated rod and by those movable parts which are directly affected by its movements; means for locking and thus maintaining such adjustments; a cowl in telescopic connection with the ring; means whereby changes in the relative positions of the ring and the cowl actuate the means which cause the longitudinal movement of the rod within the mast; adjustable means capably opposing pressure on the cowl due to the motion of translation; means for locking and thus ensuring the maintenance of such adjustments.

13. In a propeller construction a ring; attached to the ring a blade mast extending radially outward; frames for controlled blade sections pivotally mounted on the mast; members comprising extensors housed in the frames; flexible, elastic surfaces completely enclosing the masts and the frames; means for controlling the angular settings of the concentric pivotally mounted frames; means for controlling the degrees to which the extensors protrude beyond their housings; a concentric inner ring; flexible members of stream lined form connecting the two rings; means for adjusting the tension of the flexible members which connect the rings; means for adjusting the angular settings of the outer ends of the said stream-lined flexible members; means for adjusting the angular settings of the inner ends of the said stream lined flexible members; means for rotating the inner ring; brackets set within the radius of the inner ring, secured to the engine frame or to a rigid part of the craft; pins rigidly attached to the brackets; thrust wheels mounted on the pins in contact with a suitably formed part of the inner ring, so that when the propeller is rotated the thrust forces developed by the blade are transmitted through the non-rotating brackets to the engine frame or to some rigid part of the craft.

14. In the construction of a propeller blade, a mast; frames for controlled concentric blade sections pivotally mounted on the mast; separator bands fixed on the mast between the frames; continuous flexible elastic sufaces completely incasing the assembled blade parts; means for controlling differentially the angular settings of individual frames; members comprising extensors housed in certain of the frames; a jointed rod movable longitudinally within the mast; a pin fixed transversely to each piece of the rod; for each section frame which houses extensors, a collar or yoke substantially encircling the mast and movable upon it; holes in each yoke allowing the transverse pin for that section to pass through the yoke; diverging slots cut in flat, wing-like projections formed on opposite sides of each yoke; pins attached to the extensors, engaged in the diverging slots; a master transverse pin for the innermost piece of the rod; a turnable sleeve encircling the heel of the mast; means for turning the heel sleeve on the mast; diagonal or sloping cuts on opposite sides of the heel sleeve adapted, when the heel sleeve is turned to actuate the master pin which passes through the cuts, thus moving the entire rod within the mast; a collar movably encircling the heel sleeve; holes in the heel sleeve collar in which the ends of the master pin are set; a rack fixed on the collar; a chain of meshing gears co-acting so that when the rack collar is moved lengthwise of the heel sleeve a threaded weight on a lever arm is caused to move in the reverse direction; a lever arm threaded so that the position upon it of said weight may be adjusted; means for locking such adjustment so that it shall not be subject to disturbance when inaccessible during operation, but shall effectively counterbalance the centrifugal forces developed by the rod and by the parts with which it is movably connected, when the blade is subjected to a rotary motion.

15. In a propeller construction, a ring; blade masts attached radially to the ring; blade section frames mounted pivotally on the masts; means adapted to effect definite changes in the angular settings of the frames; means adapted to effect definite changes in the chord lengths of concentric blade sections, thus changing the blade area; a flexible, elastic cover for each assembled blade; a cowl in telescopic connection with the ring; members rigidly attached transversely to the ring; stiffeners on the cowl, so placed that each co-acts with a side of a rigid transverse member to form a race or runway; a series of balls set in each runway adapted to facilitate the telescopic action of the cowl and ring; means actuated by said telescopic action adapted to actuate the means whereby changes are effected in the angular settings of blade sections and also to actuate the means by which changes are effected in the area of blades; balls of graduated weights at the end positions of each series; switching points at the ends of the runways to divert the balls which have graduated weights; radially disposed pockets attached to the ring adapted to receive balls as and when switched from the runways; means for rotating the ring so that centrifugal forces are developed by the balls in the pockets, which, acting through the balls remaining in the runways, capably oppose the pressure on the cowl resulting from any motion of translation; threaded sockets attached to the cowl; a port or opening in the side of each socket; threaded adjusting pieces screwable in the sockets, disposed in line with the centers of the balls in runways; longitudinal chases in the threaded adjusting pieces; bolts, housed in the socket ports, each being normally held in firm engagement with a selected longitudinal chase so as to prevent movement of its threaded adjusting piece in its socket; springs to maintain the bolts in the locking position; so that adjustments regulating the weight of balls to be switched into the pockets may be made to meet anticipated conditions and positively maintained.

16. In a propeller construction, an outer ring; blades attached to the outer ring extending radially outward; a concentric inner ring; flexible members of stream-lined sectional contour capably connecting the outer and inner rings; a circular flange secured on the outer end of each flexible member; interiorly threaded sockets formed in the outer ring; tubular threaded pieces adjustably set in the sockets, adapted to effect adjustments of the tension of the flexible members inasmuch as the flexible members flanges are in contact with the outer annular surfaces of these threaded pieces; an arc gear attached to or keyed on the outer surface of each of said flanges; a hoop-like member rotatable relative to the outer ring; racks on the hoop in mesh with said arc gears on the flexible members; radially extending lugs set on the inner ring; holes in the lugs in which the tangentially disposed inner ends of the flexible members are turnably fitted; gears attached to said inner ends; racks meshing with said gears; pins projecting from the racks; collars movably encircling the inner ring; slots in the collars in which the said pins are engaged; a non-flexible member of appropriate curvature and of stream-lined sectional contour extending radially between the inner and outer rings; a gear fixed near the inner end bearing of the non-flexible member, meshing with racks cut in edges of the slotted collars; a gear on the outer end of said non-flexible member meshing with a rack attached to the hoop; means for turning the non-flexible member about its longitudinal axis so that the racks on the hoop actuate the arc gears to change the angular settings of the outer ends of the flexible members while the turning of the collars on the inner ring causes the racks to actuate the inner gears thus changing the angular settings of the inner ends of the flexible members.

17. In a propeller construction, a ring; means capable of causing rotation of the ring; a drive shaft coinciding with the axis about which the ring rotates; a turnable member, non-flexible, stream-lined in section, extending radially between bearings set on the ring and on the drive shaft; a cowl movable telescopically in relation to the ring; a rack firmly fastened to the cowl; a pinion set on the outer end of said non-flexible member in mesh with the cowl rack; a gear fastened near the inner end of the non-flexible member adjacent to its drive shaft bearing; a collar surrounding and turnable on the drive shaft; a rack cut in a side of the collar in mesh with said gear; curved slots in the collar; pins engaged in the slots; a ball-bearing having its inner race splined with the drive shaft and slidable upon it; fingers attached to and extending outward from a radial surface of said inner race, firmly holding said engaged pins; a rack secured to the outer race of the ball-bearing; brackets on the engine frame or fastened on some solid part of the craft, abutting said rack to prevent rotation of the outer race of the ball-bearing; an arc gear in mesh with the last named rack; a lever integral with said arc gear; linkage connecting said lever with one end of an arcuate member, the other end of which swings on a pin fixed conveniently in the pilots cabin or in the engine room; a setting clamp slidable on said arcuate member; a pivot pin fixed upon and therefore movable with said setting clamp; a link swinging at one end upon said movable pivot pin; a member, pivotally connected with the other end of this link, having a slidable clamp with setting screw mounted upon it; linkage connecting said screw-set clamp with the throttle valve controlling the engine; so that the pilot can place said screw-set clamp to correspond with any desired position of the throttle valve lever controlling the engine and further, can place the setting clamp on the arcuate member so that the degree to which relative movements of the cowl and ring affect the control of the engine may be determined by him.

GEORGE FREDERICK BUCKINGHAM.